United States Patent [19]  [11] 4,139,680
Schlaikjer  [45] Feb. 13, 1979

[54] METHOD FOR PREVENTING DENDRITIC GROWTH IN SECONDARY CELLS

[75] Inventor: Carl R. Schlaikjer, Arlington, Mass.

[73] Assignee: P. R. Mallory & Co. Inc., Indianapolis, Ind.

[21] Appl. No.: 775,829

[22] Filed: Mar. 9, 1977

Related U.S. Application Data

[63] Continuation-in-part of Ser. No. 610,518, Sep. 3, 1975, Pat. No. 4,020,240.

[51] Int. Cl.² ............................................. H01M 10/36
[52] U.S. Cl. ...................................... 429/50; 429/196
[58] Field of Search ........................... 429/50, 196, 197

[56] References Cited

U.S. PATENT DOCUMENTS

| | | | |
|---|---|---|---|
| 3,493,433 | 2/1970 | Hoffmann | 429/196 |
| 3,998,657 | 12/1976 | Auborn et al. | 429/196 |
| 4,020,240 | 4/1977 | Schlaikjer | 429/50 |

*Primary Examiner*—Donald L. Walton
*Attorney, Agent, or Firm*—Ronald S. Cornell; Israel Nissenbaum; Charles W. Hoffmann

[57] ABSTRACT

A high conductivity stable clovoborate electrolyte salt is used in alkali and alkaline earth metal non-aqueous secondary cells to prevent dendritic formation of the plated alkali or alkaline earth metal.

13 Claims, No Drawings

METHOD FOR PREVENTING DENDRITIC GROWTH IN SECONDARY CELLS

This application is a continuation in part of copending application Ser. No. 610,518 filed Sept. 3, 1975 and now U.S. Pat. No. 4,020,240 issued on Apr. 26, 1977.

This invention relates generally to the use of electrolyte salts in ambient temperature secondary cells having alkali or alkaline earth metal anodes and a non-aqueous solvent for the electrolyte salt, in order to prevent dendrite growth. In particular, this invention relates to such cells having a lithium anode and an inorganic electrolyte solvent.

A substantial shortcoming for the utilization of lithium and other alkali and alkaline earth metal ambient temperature rechargeable cells is the morphology of the plate metal upon charging of the cell (molten alkali metal cells do not, of course, have this problem but they must be maintained at elevated temperatures). These metals, and in particular lithium, form highly porous dendritic deposits which result in inefficiency of cell utilization and premature shorting of the cell.

As a result, the coulombic charge recovered from a substrate metal on which a metal such as lithium has been plated is only a fraction of the charge used to carry out the plating. When dendritic lithium, for example, is electrochemically stripped during discharge of the cell, oxidation of the lithium occurs at the base of the dendrites faster that at the tips thereby resulting in large crystals becoming disconnected prior to discharge with a loss of capacity. Additionally, the disconnected dendrites increase the probablity of internal short circuiting of the cell. The high surface area created by the porous dendritic plating also results in greater side reactions between the bare metal and the electrolyte thereby further decreasing the usable life of the cell. Furthermore, in non-aqueous inorganic solvent cells such as those utilizing sulfur dioxide ($SO_2$) or thionyl chloride ($SOCl_2$) a protective coating is formed on the surface of the anode metal (e.g. lithium) which protects the anode from extensive chemical attack by the electrolyte. With a dendritic plated anode the protective coating not only becomes a significant fraction of the anode metal because of the high surface area of the dendrites but aggravates the initial delay time associated with such cells.

Ambient temperature alkali or alkaline earth metal secondary cells have generally been restricted to those cells having organic electrolyte solvents because of the stability and solubility of electrolyte salts therein. (Common electrolyte salts such as halides tend to slowly react with inorganic solvents such as $SO_2$. For example potassium bromide (KBr) reacts as follows: $4KBr + 4SO_2 \rightarrow 2K_2SO_4 + S_2Br_2 + Br_2$). However these organic electrolyte solvents gradually deteriorate in the presence of alkali metals, either by corrosion of the metal, polymerization or reaction with other cell components. Additionally, the conductivity of many of the more stable electrolyte salts is too low to allow for high cathode effiency at reasonable current densities.

It is therefore an object of the present invention to provide an electrolyte salt for use in secondary alkali and alkaline earth metal cells which not only has the characteristics of (1) chemical stability against reaction with alkali and alkaline earth metals and organic and inorganic solvents, (2) high solubility in a number of organic as well as inorganic liquids, and (3) high conductivity in the organic and inorganic liquids; but which also improves the morphology of plated metals such that dendrites can be avoided entirely with a resultant increase in coulombic cycling efficiency.

It has been discovered that the clovoborate electrolyte salts described in my co-pending application Ser. No. 610,518 and now U.S. Pat. No. 4,020,240 have the abovementioned properties of stability and high solubility and conductivity and which prevents dendritic plating of alkali and alkaline earth metals as well.

The clovoborate salt has an anion with a closed cage formation with the general formula $(B_m X_n)^{-k}$ where B is the element boron and m,n and k are integers and X can be selected from a wide range of elements and groups of elements which may also include organic groups alone or in combination. The substituent groups on the caged boron structure may control, to some extent, the usefulness of the salt as an electrolyte salt. As examples of several clovoborate salts useful in rechargeable electrochemical cells, X in the above formula is preferably selected from the halogens (F, Cl, Br and I) but can also be H or OH preferably in combination with halogen or halogens. The halogenated form of the clovoborate anion appears to provide more advantageous results than the hydride form because where X is hydrogen rather than a halogen, the B–X bond appears less stable, but all nevertheless embody the concepts of the invention. With the halogen and hydrogen forms of the clovoborate anion just mentioned, the preferable forms would be those in which m and n of the above formula are integers selected from the group of 6–20 for m and 6–18 for n. Most preferably m and n are both 6,9,10,11 or 12. Generally both m and n are the same, but in some cases they may differ because of cage linkups. The integer k may range from 1–4 but preferably is 2. As a single embodiment a presently preferred composition is where X is chlorine and m and n are both 10.

These clovoborate anions have the unique caged structure which it is postulated provides the stability of the clovoborate salt in assorted organic and inorganic solvents and with associated alkali and alkaline earth metal anodes.

High energy density electrochemical cells utilize as anodes the alkali or alkaline earth metals such as lithium, sodium, potassium, rubidium, cesium, beryllium, magnesium, calcium, strontium, and barium or alloys thereof. Accordingly, the metal of the cation of the clovoborate salt should correspond to the metal (or metals) of the anode. This correspondence between anode and salt cation minimizes coplating of undesirable metals onto the anode during recharging cycles.

The preferred anode in high energy density cells is lithium because of its high potential and low weight. Lithium clovoborate salts useful with the lithium anode include $Li_2B_{10}Cl_{10}$, $Li_2B_{10}Br_{10}$, $Li_2B_{10}I_{10}$, $Li_2B_{12}Cl_{12}$, $Li_2B_{12}Br_{12}$, $Li_2B_{12}I_{12}$, $Li_2B_6Br_6$, and $Li_2B_{12}Br_8F_4$. Less preferred salts include $Li_2B_9Cl_8H$, $Li_2B_9Br_6H_3$, $Li_2B_{12}Br_9H_2$, $Li_2B_{12}H_8F_4$, $Li_2B_{12}H_7F_5$, and $Li_2B_{12}H_6F_6$ and $Li_2B_{12}F_{11}OH$. The most preferred lithium salt is $Li_2B_{10}Cl_{10}$ (corresponding alkali or alkaline earth metal salts of the $B_{10}Cl_{10}^{--}$ anion are also most preferred with anodes having the same alkali or alkaline earth metal).

The electrolyte salts of the present invention are especially useful in secondary electrochemical cells utilizing an electrolyte solvent/soluble cathode because they prevent dendrites with extensive protective coatings associated with electrolyte solvent/soluble cathodes. These electrolyte solvent/soluble cathodes are selected from a fluid oxyhalide, or nonmetallic oxide or non-metallic halide and mixtures thereof such as thionyl chloride ($SOCl_2$), phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$); sulfuric oxychloride ($SO_2Cl_2$), Nitryl chloride ($NO_2Cl$), nitrosyl chloride ($NOCl$), nitrogen dioxide ($NO_2$) sulfur monochloride ($S_2Cl_2$) and sulfur monobromide ($S_2Br_2$). Other soluble cathodes include halogens such as bromine and chlorine. Insoluble cathodes include intercalation compounds such as the sulfides, selenides or tellurides of titanium, niobium, tantalum, molybdenum or tungsten, and conventional transition metal oxides, halides and sulfides.

Organic solvents for use in high energy density cells include common solvents such as tetrahydrofuran, propylene carbonate, dimethyl sulfite, dimethyl sulfoxide, N-nitrosodimethylamine, gamma-butyrolactone, dimethyl carbonate, methyl formate, butyl formate, dimethoxyethane, acetonitrile and N:N dimethyl formamide.

The amount of electrolyte salt to be used is generally determined by the required conductivity. A greater conductivity and thus larger amounts of the electrolyte salt are necessary for high rate applications. Solubility in the electrolyte solvent thus is an important factor in achieving requisite conductivity. Furthermore, in order for an electrolyte salt to be useful it must remain soluble within the electrolyte solvent even under conditions of low temperature since any precipitation of the salt would drastically reduce the conductivity within the cell and concomitantly impair the drain rate capacity.

A preferred conductivity range for the electrolyte solution within the cell is from $4.0 \times 10^{-9}$ to $1 \times 10^{-1}$ $ohm^{-1} cm^{-1}$ at 20° C. with a more preferred conductivity of at least $1 \times 10^{-4} ohm^{-1} cm^{-1}$ at 20° C. The above described clovoborate salts are highly soluble in organic and inorganic solvents and thus fall within the above conductivity range even under extremes of temperatures and even in the inorganic solvents in which prior art electrolyte salts are normally insufficiently soluble.

The following Example illustrates the conductivity of a clovoborate salt, $Li_2B_{10}Cl_{10}$, in liquid sulfur dioxide, under varying temperature conditions.

EXAMPLE I

The conductivity of ten ml of a 0.60 N solution of $Li_2B_{10}Cl_{10}$ in liquid sulfur dioxide is measured in a device suitable for measuring conductivities of electrolytes under pressure. The conductivity of this mixture is as follows:

TABLE I

| Temperature (° C) | Conductivity ($ohm^{-1} cm^{-1}$) |
|---|---|
| −20 | $1.38 \times 10^{-2}$ |
| 0 | $1.79 \times 10^{-2}$ |
| 20 | $2.02 \times 10^{-2}$ |
| 30 | $2.20 \times 10^{-2}$ |
| 50 | $2.31 \times 10^{-2}$ |
| 70 | $2.42 \times 10^{-2}$ |

The conductivities vary only slightly over a temperature range of 90° C. indicating only a slight effect of temperature on electrolyte solubility and conductivity. Additionally it should be noted that most prior art electrolyte salts are not appreciably soluble in pure $SO_2$ without cosolvents.

The following Examples illustrate the ability of the aforementioned clovoborate electrolyte salts in preventing dendritic plating when high energy density non-aqueous secondary cells are recharged. All parts are parts by weight unless otherwise specified. Since these examples are for illustrative purposes any specific enumerations are not to be construed as limitations on the invention as claimed.

EXAMPLE II

A pyrex jacketed cylindrical cell having the dimensions of 1 inch outside diameter × 3 ½ inches height with a wall thickness of 3/16 inch was fitted with three nickel screen electrodes. Each of the electrodes had the dimensions of 1 inch by ¼ inch with one of the screens covered by a piece of sodium foil pressed thereupon for use as a sodium source for plating. The cell was filled with a solution of 1.53 grams (6.0 meq) of $Na_2B_{10}Cl_{10}$ dissolved in liquid sulfur dioxide ($SO_2$) sufficient to equal a total volume of 10 ml. The cell was sealed with a rubber stopper through which the electrode leads protruded. The conductivity of the solution within the cell was estimated to be about $2.3 \times 10^{-3} ohm^{-1} cm^{-1}$ at room temperature from the overpotentials during transfer of sodium from the foil electrode to one of the screen electrodes.

Plating of sodium to the second of the screen electrodes was carried out while using the plated first screen as the reference electrode. The second screen was plated for ½ hour at 10 ma after which the screen was stripped of its sodium by electrochemical stripping at 5 ma. The overall efficiency of the plating was calculated as being 57%. During the plating no dendrites of sodium were apparent. Instead a uniform gray coating was observed on the screen through the glass cell.

EXAMPLE III

A cell as in the first Example was prepared except that 1.2 grams (6.0 meq) of $Li_2B_{10}Cl_{10}$ were used in place of the sodium salt and the foil attached to one of the screens was lithium instead of sodium. Lithium was thereafter plated onto one of the screens in order that the so plated screen operate as a reference electrode. A current of 5 ma was used to plate and strip the remaining screen with the results as shown in the following table.

TABLE II

| Cycle No. | Plating Time | Time between plate & strip | Overall efficiency | Dendrite formation |
|---|---|---|---|---|
| 1 | 41 min. | 0 | 86.3% | None |
| 2 | 2.76 hours | 0 | 84.8% | None |
| 3–13 | 3 min. | 0 | 72.6–88.1% | None |
| 14–17 | 3 min. | 4.17 min. | 72–83% | None |

From the above Examples it is apparent that dendritic plating of metals such as sodium and lithium is retarded if not eliminated entirely by the utilization of the novel clovoborate salts of the present invention. As seen from Example III the retardation of dendritic growth occurs even under repeated cycling and for extensive periods of time. Additionally, the clovoborate electrolyte salts provide for reasonable secondary cell utilization even without the presence of an organic electrolyte solvent.

The foregoing examples are illustrative of the invention and its advantage of prevention of dendritic growth upon recharging alkali or alkaline metal secondary cells. It is understood that changes and variations in cell construction are possible especially since the above described test cells were constructed for internal visual monitoring and such changes and variations can be made without departing from the scope and spirit of the present invention.

What is claimed is:

1. A method for preventing dendrite formation in a rechargeable electrochemical cell having an anode comprising at least one metal which is subject to dendrite formation upon charging of said cell, a non-aqueous electrolyte solvent, and a cathode; comprising the steps of dissolving in said solvent an electrolyte salt having a metal cation and a clovoborate anion and charging said cell while in the discharged state whereby said electrolyte salt prevents said dendrite formation.

2. The method of claim 1 wherein said clovoborate anion has a formula $(B_mX_n)^{-k}$ wherein m, n and k are integers with m ranging from 6–20, n ranging from 6–18 and k ranging from 1–4, B is boron, and X is selected from the group consisting of H, F, Cl, Br, I, OH and combinations thereof.

3. The method of claim 2 wherein said clovoborate anion has the formula $(B_{10}Cl_{10})^{--}$.

4. The method of claim 1 wherein said non-aqueous electrolyte solvent is inorganic.

5. The method of claim 4 wherein said inorganic solvent is selected from the group consisting of sulfur dioxide and thionyl chloride.

6. The method of claim 1 wherein said metal subject to dendrite formation is lithium.

7. The method of claim 5 wherein said metal subject to dendrite formation is lithium.

8. The method of claim 1 wherein said metal subject to dendrite formation is sodium.

9. The method of claim 1 wherein said metal cation is the same metal as that of at least one metal of said anode.

10. The method of claim 7 wherein said metal of said metal cation is lithium.

11. The method of claim 10 wherein said electrolyte salt has the formula $Li_2B_{10}Cl_{10}$.

12. The method of claim 8 wherein said electrolyte salt has the formula $Na_2B_{10}Cl_{10}$.

13. The method of claim 1 wherein said metal is selected from the group consisting of lithium, sodium, potassium, rubidium, cesium, beryllium, magnesium, calcium, strontium and barium.

* * * * *